(12) United States Patent
Seki et al.

(10) Patent No.: US 11,821,168 B2
(45) Date of Patent: Nov. 21, 2023

(54) CONTROL DEVICE FOR LOADING MACHINE AND CONTROL METHOD FOR LOADING MACHINE

(71) Applicant: Komatsu Ltd., Tokyo (JP)

(72) Inventors: Yohei Seki, Tokyo (JP); Masataka Ozaki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 528 days.

(21) Appl. No.: 16/979,618

(22) PCT Filed: Mar. 11, 2019

(86) PCT No.: PCT/JP2019/009790
§ 371 (c)(1),
(2) Date: Sep. 10, 2020

(87) PCT Pub. No.: WO2019/207981
PCT Pub. Date: Oct. 31, 2019

(65) Prior Publication Data
US 2021/0040711 A1 Feb. 11, 2021

(30) Foreign Application Priority Data
Apr. 27, 2018 (JP) ................... 2018-087774

(51) Int. Cl.
*E02F 9/20* (2006.01)
*E02F 9/26* (2006.01)
(52) U.S. Cl.
CPC .......... *E02F 9/2029* (2013.01); *E02F 9/2041* (2013.01); *E02F 9/262* (2013.01)
(58) Field of Classification Search
CPC ....... E02F 9/2029; E02F 9/2041; E02F 9/262; E02F 9/265; E02F 3/434; G05D 1/0225; G05D 1/024; G05D 1/0251
See application file for complete search history.

(56) References Cited

U.S. PATENT DOCUMENTS

| 5,941,921 A | 8/1999 | Dasys et al. |
| 6,247,538 B1 | 6/2001 | Takeda et al. |

(Continued)

FOREIGN PATENT DOCUMENTS

| AU | 199897027 A1 | 7/1999 |
| CN | 101936018 A | 1/2011 |

(Continued)

OTHER PUBLICATIONS

International Search Report dated May 21, 2019, issued for PCT/JP2019/009790.
The extended European search report dated Oct. 8, 2021, issued in the corresponding European patent application No. 19792771.8.

*Primary Examiner* — Russell Frejd
(74) *Attorney, Agent, or Firm* — Locke Lord LLP

(57) ABSTRACT

A control device for a loading machine includes a measurement data acquisition unit that acquires measurement data of a measurement device mounted on the loading machine that includes working equipment, a target calculation unit that extracts, from the measurement data, loading target data being measurement data on a loading target on which excavated material excavated by the working equipment is loaded and calculates, based on the loading target data, height data indicating a height of an upper end portion of the loading target and distance data indicating a distance from the loading machine to the loading target, and a working equipment control unit that controls the working equipment based on the height data and the distance data.

11 Claims, 12 Drawing Sheets

(56) References Cited

U.S. PATENT DOCUMENTS

| | | | |
|---|---|---|---|
| 6,363,632 B1 | 4/2002 | Stentz et al. | |
| 10,435,868 B2 | 10/2019 | Tsuji et al. | |
| 2011/0318156 A1 | 12/2011 | Saito et al. | |
| 2012/0296531 A1 | 11/2012 | Hyodo et al. | |
| 2016/0035149 A1* | 2/2016 | Friend | G07C 5/008 |
| | | | 701/300 |
| 2016/0196749 A1* | 7/2016 | Chen | G08G 1/096775 |
| | | | 701/2 |
| 2017/0073925 A1* | 3/2017 | Friend | E02F 9/261 |
| 2018/0080193 A1 | 3/2018 | Myers | |
| 2018/0171594 A1 | 6/2018 | Tsuji et al. | |
| 2019/0024348 A1 | 1/2019 | Hiekata | |
| 2019/0093311 A1 | 3/2019 | Naito | |
| 2020/0018037 A1* | 1/2020 | Nakamura | E02F 3/43 |
| 2020/0362530 A1* | 11/2020 | Seki | E02F 3/434 |
| 2021/0002852 A1* | 1/2021 | Nishi | E02F 9/262 |
| 2021/0032837 A1* | 2/2021 | Naito | E02F 3/422 |

FOREIGN PATENT DOCUMENTS

| | | |
|---|---|---|
| EP | 3412837 A1 | 12/2018 |
| GB | 2332415 A | 6/1999 |
| JP | H10-88625 A | 4/1998 |
| JP | H11-310939 A | 11/1999 |
| JP | H11-350534 A | 12/1999 |
| JP | 2000-136549 A | 5/2000 |
| JP | 2008-248523 A | 10/2008 |
| JP | 2017-155491 A | 9/2017 |
| JP | 2017-227454 A | 12/2017 |
| WO | 2010/104138 A1 | 9/2010 |
| WO | 2011/074583 A1 | 6/2011 |
| WO | 2017/033769 A1 | 3/2017 |
| WO | 2018/043091 A1 | 3/2018 |
| WO | 2018/043104 A1 | 3/2018 |

* cited by examiner

FIG.12
(A)
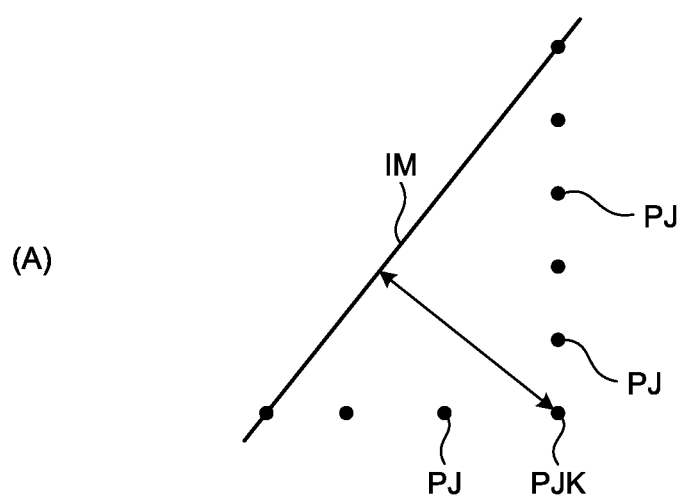
(B)
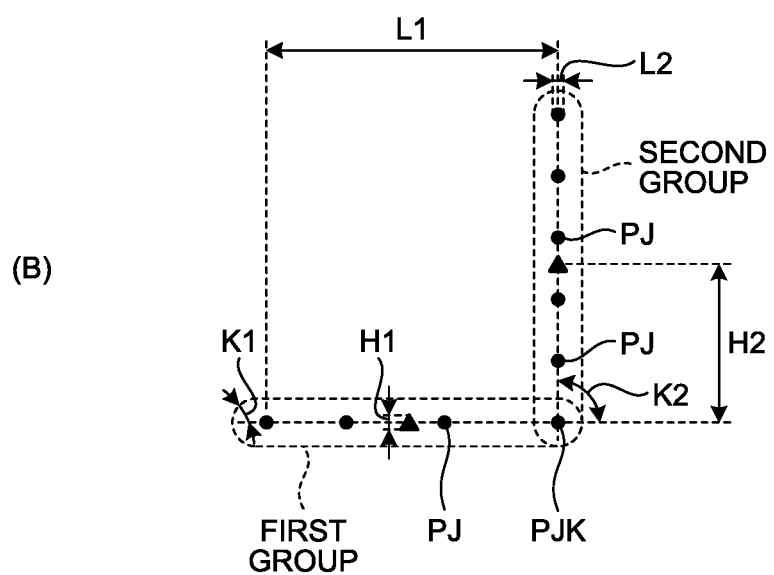

CONTROL DEVICE FOR LOADING MACHINE AND CONTROL METHOD FOR LOADING MACHINE

FIELD

The present invention relates to a control device for a loading machine and a control method for a loading machine.

BACKGROUND

Loading machines are used on work sites. Patent Literature 1 discloses an example of an automatic excavator including a measurement device for obtaining a distance to an excavation target and a distance to a loading target.

CITATION LIST

Patent Literature

Patent Literature 1: JP H10-088625 A

SUMMARY

Technical Problem

To achieve automatization of loading work by a loading machine, a technology capable of favorably measuring a distance between the loading machine and a loading target is required.

According to an aspect, an object of the present invention is to favorably measure a distance between a loading machine and a loading target.

Solution to Problem

According to an aspect of the present invention, a control device for a loading machine, comprises: a measurement data acquisition unit that acquires measurement data of a measurement device mounted on the loading machine that includes working equipment; a target calculation unit that extracts, from the measurement data, loading target data being measurement data on a loading target on which excavated material excavated by the working equipment is loaded and calculates, based on the loading target data, height data indicating a height of an upper end portion of the loading target and distance data indicating a distance from the loading machine to the loading target; and a working equipment control unit that controls the working equipment based on the height data and the distance data.

Advantageous Effects of Invention

According to an aspect of the present invention, a relative position between the loading machine and the loading target can be preferably measured.

BRIEF DESCRIPTION OF DRAWINGS

FIG. 12 is a schematic diagram illustrating division into groups according to the present embodiment.

DESCRIPTION OF EMBODIMENTS

Embodiments according to the present invention will be described below with reference to the drawings, but the present invention is not limited thereto. Component elements of the embodiments described below may be appropriately combined with each other. Furthermore, some of the component elements may not be used.

First Embodiment

[Wheel Loader]

Figure 1:
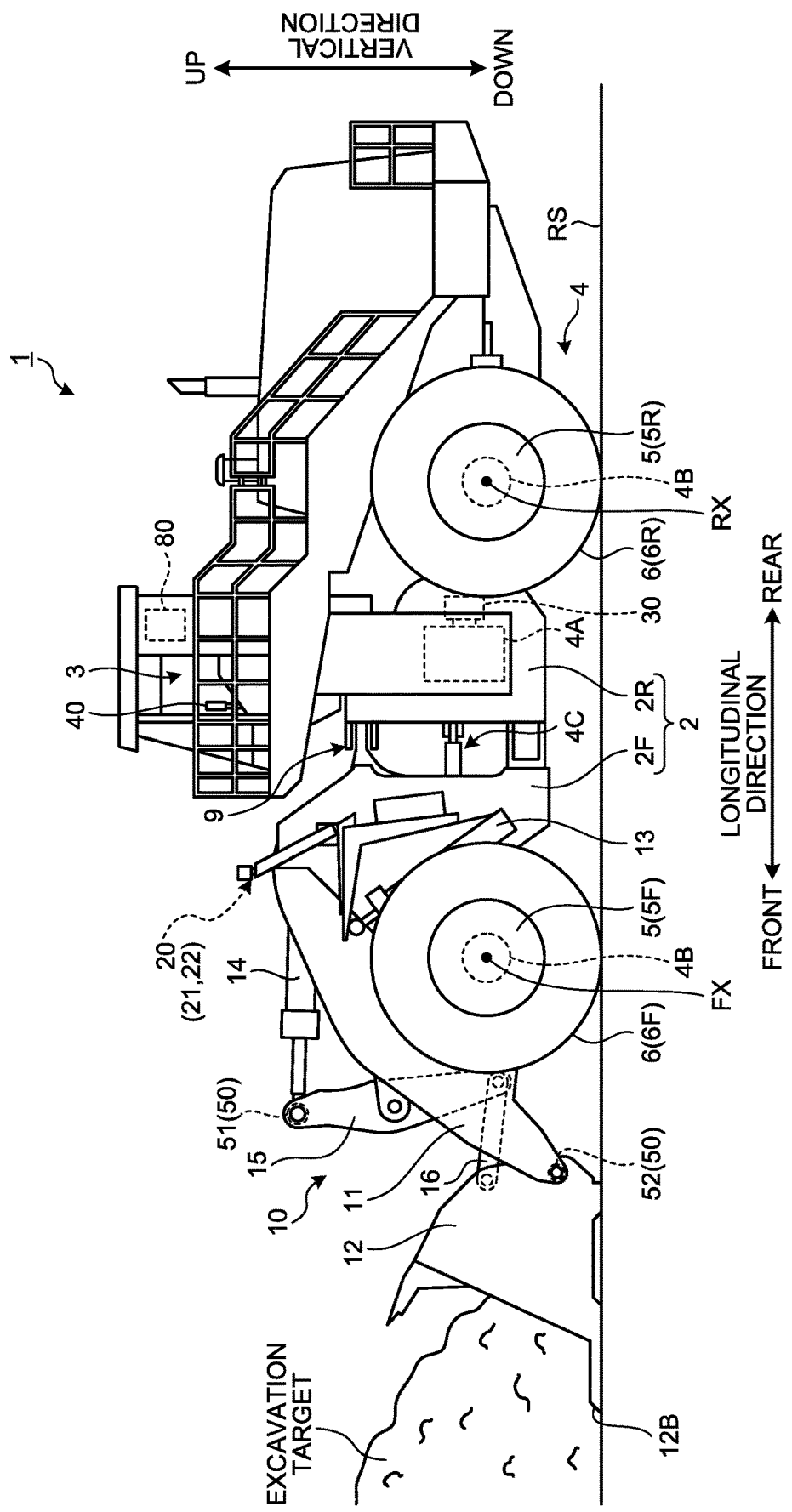
FIG. 1 is a side view of an example of a loading machine according to the present embodiment.

FIG. 1 is a side view of an example of a loading machine 1 according to the present embodiment. The loading machine 1 performs predetermined work on a work target on a work site. In the present embodiment, the loading machine 1 is a wheel loader 1 that is a kind of articulated loading machine. The predetermined work includes excavation work and loading work. The work target includes an excavation target and a loading target. The wheel loader 1 performs the excavation work for excavation of the excavation target and the loading work for loading of excavated material resulting from the excavation work on the loading target. The loading work is a concept that includes discharging work discharging the excavated material to a discharging target. As the excavation target, at least one of natural ground, rocky mountain, coal, and a wall surface is exemplified. The natural ground is a mountain including earth and sand, and the rock mountain is a mountain including rock or stone. Examples of the loading target include at least one of a transport vehicle, a predetermined area of a work site, a hopper, a belt conveyor, and a crusher.

As illustrated in FIG. 1, the wheel loader 1 includes a vehicle body 2, a cab 3 that is provided with a driver's seat, a travel unit 4 that supports the vehicle body 2, a working equipment 10 that is supported by the vehicle body 2, an angle sensor 50 that detects the angle of the working equipment 10, a transmission device 30, a three-dimensional measurement device 20 that measures a measurement target in front of the vehicle body 2, and a control device 80.

The vehicle body 2 includes a vehicle body front portion 2F and a vehicle body rear portion 2R. The vehicle body front portion 2F and the vehicle body rear portion 2R are pivotably connected via a joint mechanism 9.

The cab 3 is supported by the vehicle body 2. At least part of the wheel loader 1 is operated by a driver in the cab 3.

The travel unit 4 supports the vehicle body 2. The travel unit 4 includes a wheel 5. The wheel 5 is rotated by a driving force generated by an engine mounted to the vehicle body 2. A tire 6 is mounted to the wheel 5. The wheels 5 include two front wheels 5F that are mounted to the vehicle body front portion 2F and two rear wheels 5R that are mounted to the vehicle body rear portion 2R. The tires 6 include front tires 6F that are mounted on the front wheels 5F and rear tires 6R that are mounted on the rear wheels 5R. The travel unit 4 is configured to travel on a ground surface RS.

Each of the front wheels 5F and front tires 6F are rotatable around a rotation axis FX. Each of the rear wheels 5R and rear tires 6R are rotatable around a rotation axis RX.

In the following description, a direction parallel to the rotation axis FX through the front wheels 5F is appropriately referred to as a vehicle width direction, a direction orthogonal to a ground contact surface of the front tire 6F that makes contact with a ground surface RS is appropriately referred to as a vertical direction, and a direction orthogonal to both of the vehicle width direction and the vertical direction is appropriately referred to as a longitudinal direction. When the vehicle body 2 of the wheel loader 1 travels straight, the rotation axis FX and the rotation axis RX are parallel to each other.

The travel unit 4 includes a drive device 4A, a brake device 4B, and a steering device 4C. The drive device 4A generates a driving force for accelerating the wheel loader 1. The drive device 4A includes an internal combustion engine such as a diesel engine. The driving force generated by the drive device 4A is transmitted to the wheels 5 via the transmission device 30, and the wheels 5 rotate. The brake device 4B generates a braking force for decelerating or stopping the wheel loader 1. The steering device 4C is configured to adjust the traveling direction of the wheel loader 1. The traveling direction of the wheel loader 1 includes the direction of the vehicle body front portion 2F. The steering device 4C causes a hydraulic cylinder to pivot the vehicle body front portion 2F to adjust the traveling direction of the wheel loader 1.

In the present embodiment, the travel unit 4 is operated by the driver in the cab 3. The working equipment 10 is controlled by the control device 80. A travel operation device 40 that operates the travel unit 4 is arranged in the cab 3. The driver operates the travel operation device 40 to cause the travel unit 4 to operate. The travel operation device 40 includes an accelerator pedal, a brake pedal, a steering lever, and a gearshift 41 that switches between forward and backward movement. By operating the accelerator pedal, the traveling speed of the wheel loader 1 increases. By operating the brake pedal, the traveling speed of the wheel loader 1 is reduced or traveling is stopped. By operating the steering lever, the wheel loader 1 swings. By operating the gearshift 41, forward or backward movement of the wheel loader 1 is switched.

The transmission device 30 transmits a driving force generated by the drive device 4A to the wheels 5.

The working equipment 10 includes a boom 11 that is turnably connected to the vehicle body front portion 2F, a bucket 12 that is turnably connected to the boom 11, a bell crank 15, and a link 16.

The boom 11 is operated by power generated by a boom cylinder 13. Extension and contraction of the boom cylinder 13 causes rising and lowering movement of the boom 11.

The bucket 12 is a working member that includes a front end portion 12B with an edge. The bucket 12 is arranged in front of the front wheel 5F. The bucket 12 is connected to a distal end portion of the boom 11. The bucket 12 is operated by power generated by a bucket cylinder 14. Extension and contraction of the bucket cylinder 14 causes dumping and tilting movement of the bucket 12.

By the dumping movement of the bucket 12, excavated material scooped up by the bucket 12 is discharged from the bucket 12. By the tilting movement of the bucket 12, the bucket 12 scoops excavated material.

The angle sensor 50 detects the angle of the working equipment 10. The angle sensor 50 includes a boom angle sensor 51 that detects an angle of the boom 11 and a bucket angle sensor 52 that detects an angle of the bucket 12. For example, the boom angle sensor 51 detects the angle of the boom 11 with respect to a reference axis of a vehicle body coordinate system defined in the vehicle body front portion 2F. The bucket angle sensor 52 detects the angle of the bucket 12 with respect to the boom 11. The angle sensor 50 may include a potentiometer or may include a stroke sensor that detects the stroke of a hydraulic cylinder.

[Three-Dimensional Measurement Device]

The three-dimensional measurement device 20 is mounted to the wheel loader 1. The three-dimensional measurement device 20 measures a work target in front of the vehicle body front portion 2F. The work target includes a loading target on which excavated material excavated by the working equipment 10 is loaded. The three-dimensional measurement device 20 measures a relative position from the three-dimensional measurement device 20 to each of a plurality of measurement points on the surface of the work target to measure a three-dimensional shape of the work target. The control device 80 calculates a parameter relating to the loading target on the basis of the measured three-dimensional shape of the loading target. As described later, the parameter relating to the loading target includes at least one of the distance to the loading target, the position of an upper end portion of the loading target, and the height of the loading target.

The three-dimensional measurement device 20 includes a laser radar 21 that is a kind of laser measurement device and a stereo camera 22 that is a kind of photogrammetric device.

[Movement]

Figure 2:
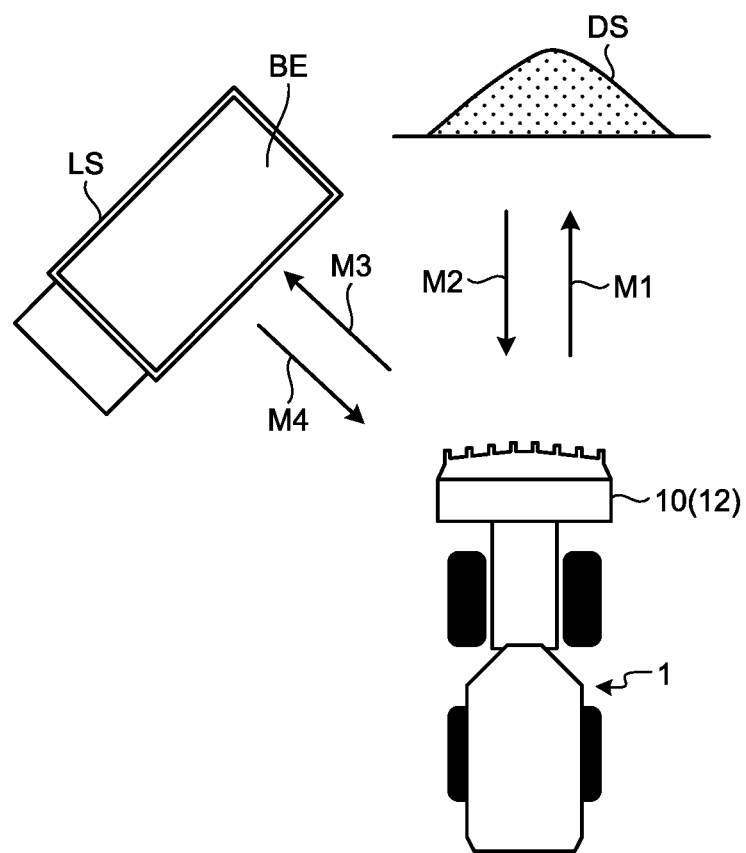
FIG. 2 is a schematic diagram illustrating movement of the loading machine according to the present embodiment.

FIG. 2 is a schematic diagram illustrating movement of the wheel loader 1 according to the present embodiment. The wheel loader 1 works in a plurality of work modes. The work modes include an excavation work mode in which the bucket 12 of the working equipment 10 excavates an excavation target, and a loading work mode in which excavated material scraped by the bucket 12 in the excavation work mode is loaded onto the loading target. An example of the excavation target includes natural ground DS placed on a ground surface RS. An example of the loading target includes a vessel BE of a transport vehicle LS that is configured to travel on the ground surface. An example of the transport vehicle LS includes a dump truck.

In the excavation work mode, the wheel loader 1 moves forward to the natural ground DS to excavate the natural ground DS by the bucket 12 of the working equipment 10 with no excavated material held in the bucket 12 of the working equipment 10. The driver of the wheel loader 1 operates the travel operation device 40 to cause the wheel loader 1 to move forward to the natural ground DS, as indicated by an arrow M1 in FIG. 2. The control device 80 controls the working equipment 10 so that the bucket 12 excavates the natural ground DS.

After the natural ground DS is excavated by the bucket 12 and the excavated material is scooped by the bucket 12, the wheel loader 1 moves backward away from the natural ground DS with the excavated material held in the bucket 12 of the working equipment 10. The driver of the wheel loader 1 operates the travel operation device 40 to cause the wheel loader 1 to move backward away from the natural ground DS, as indicated by an arrow M2 in FIG. 2.

Next, the loading work mode is executed. In the loading work mode, the wheel loader 1 moves forward to the transport vehicle LS with the excavated material held in the bucket 12 of the working equipment 10 to load the excavated material excavated by the bucket 12 of the working equipment 10 on the transport vehicle LS. The driver of the wheel loader 1 operates the travel operation device 40 to cause the wheel loader 1 to move forward, while swinging, to the transport vehicle LS, as indicated by an arrow M3 in FIG. 2. The three-dimensional measurement device 20 mounted on the wheel loader 1 measures the transport vehicle LS. The control device 80 controls the working equipment 10 to load the excavated material held in the bucket 12 on the vessel BE of the transport vehicle LS, on the basis of measurement data from the three-dimensional measurement device 20. In other words, the control device 80 controls the working equipment 10 to cause rising movement of the boom 11 while the wheel loader 1 is moving forward to the transport vehicle LS. After the rising movement of the boom 11 and positioning of the bucket 12 above the vessel BE, the control device 80 controls the working equipment 10 to cause tilting movement of the bucket 12. Thus, the excavated material is discharged from the bucket 12 and loaded on the vessel BE.

After the excavated material has been discharged from the bucket 12 and loaded on the vessel BE, the wheel loader 1 moves backward away from the transport vehicle LS with no excavated material held in the bucket 12 of the working equipment 10. The driver operates the travel operation device 40 to cause the wheel loader 1 to move backward away from the transport vehicle LS, as indicated by an arrow M4 in FIG. 2.

The driver and the control device 80 repeat the above-described movement until the vessel BE is fully loaded with the excavated material.

Figure 3:
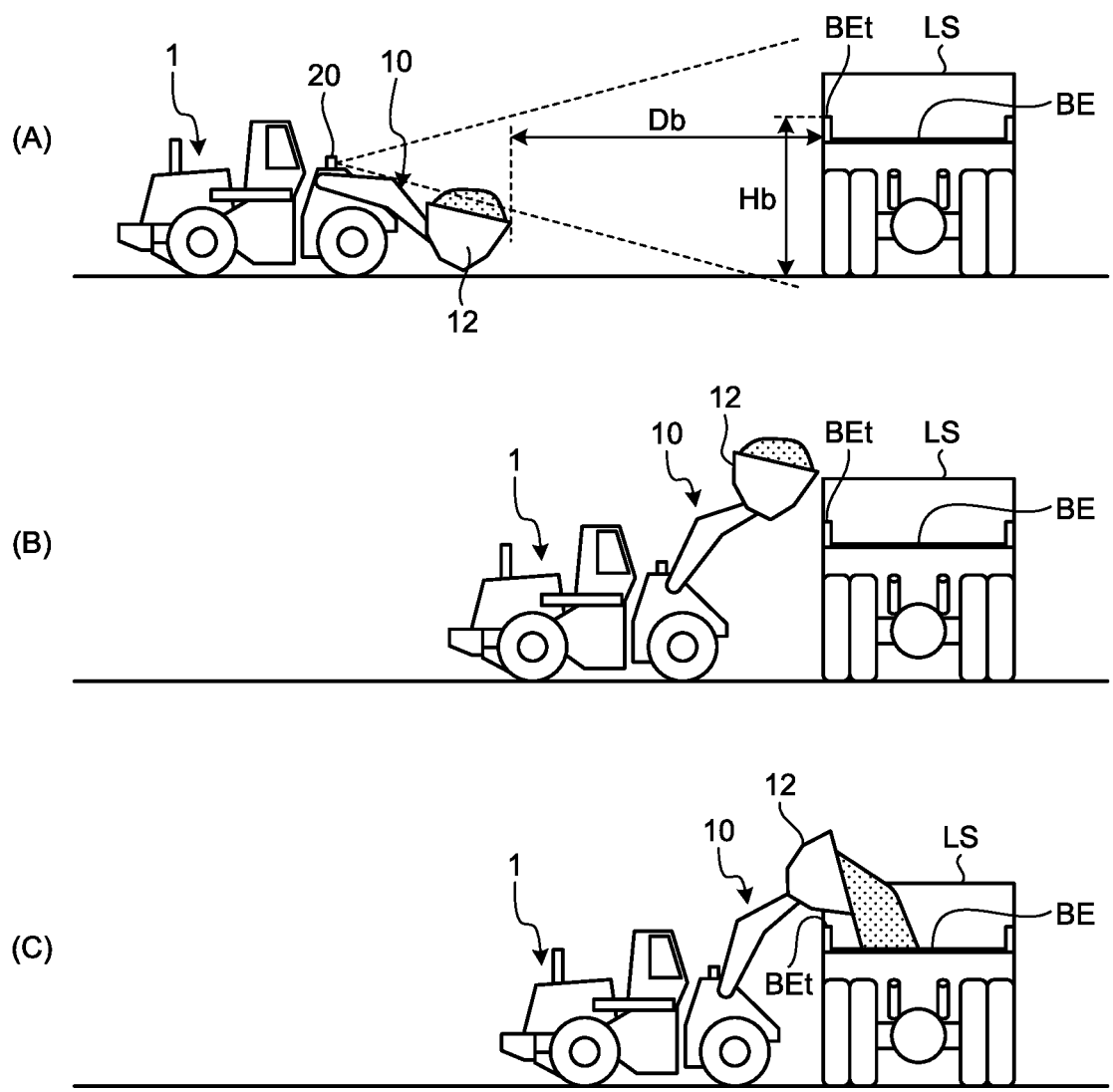
FIG. 3 is a schematic diagram illustrating a loading work mode of the loading machine according to the present embodiment.

FIG. 3 is a schematic diagram illustrating the loading work mode of the wheel loader 1 according to the present embodiment. The driver of the wheel loader 1 operates the travel operation device 40 to cause the wheel loader 1 to move forward to the transport vehicle LS. As illustrated in FIG. 3(A), the three-dimensional measurement device 20 mounted on the wheel loader 1 measures the three-dimensional shape of the transport vehicle LS and the relative position relative to the transport vehicle LS. The control device 80 detects a distance Db between the wheel loader 1 and the transport vehicle LS and a height Hb of an upper end portion BEt of the vessel BE, on the basis of measurement data from the three-dimensional measurement device 20. The distance Db from the wheel loader 1 to the transport vehicle LS includes a distance from the front end portion 12B of the bucket 12 to the transport vehicle LS, a distance from any point on the bucket 12 to the transport vehicle LS, a distance from any point on the main body of the wheel loader 1 to the transport vehicle LS, and a distance from the three-dimensional measurement device 20 to the transport vehicle LS. The distance from the front end portion 12B of the bucket 12 includes a distance from the center of the front end portion 12B and a distance from either of both ends of the front end portion 12B. The distance Db from the wheel loader 1 to the transport vehicle LS includes a distance extending in a movement direction of the vehicle body front portion 2F from the front end portion 12B of the bucket 12 to a point intersecting the transport vehicle LS and the shortest distance from the front end portion 12B of the bucket 12 to the transport vehicle LS. The distance Db from the wheel loader 1 to the transport vehicle LS includes a horizontal distance and a distance in a direction parallel to the ground surface RS. The distance Db to the transport vehicle LS includes a distance to the closest point on the transport vehicle LS, that is, a point on the transport vehicle LS closest to the wheel loader 1.

As illustrated in FIG. 3(B), the control device 80 causes the rising movement of the boom 11 while controlling the angle of the bucket 12 so as to position the bucket 12 above the upper end portion of the vessel BE and so as to hold the excavated material in the bucket 12 without spilling, on the basis of measurement data from the three-dimensional measurement device 20, while the wheel loader 1 is moving forward to the transport vehicle LS.

As illustrated in FIG. 3(C), after the rising movement of the boom 11 and positioning of the bucket 12 above the vessel BE, the control device 80 controls the working equipment 10 to cause tilting movement of the bucket 12. Thus, the excavated material is discharged from the bucket 12 and loaded on the vessel BE.

Control Device

Figure 4:
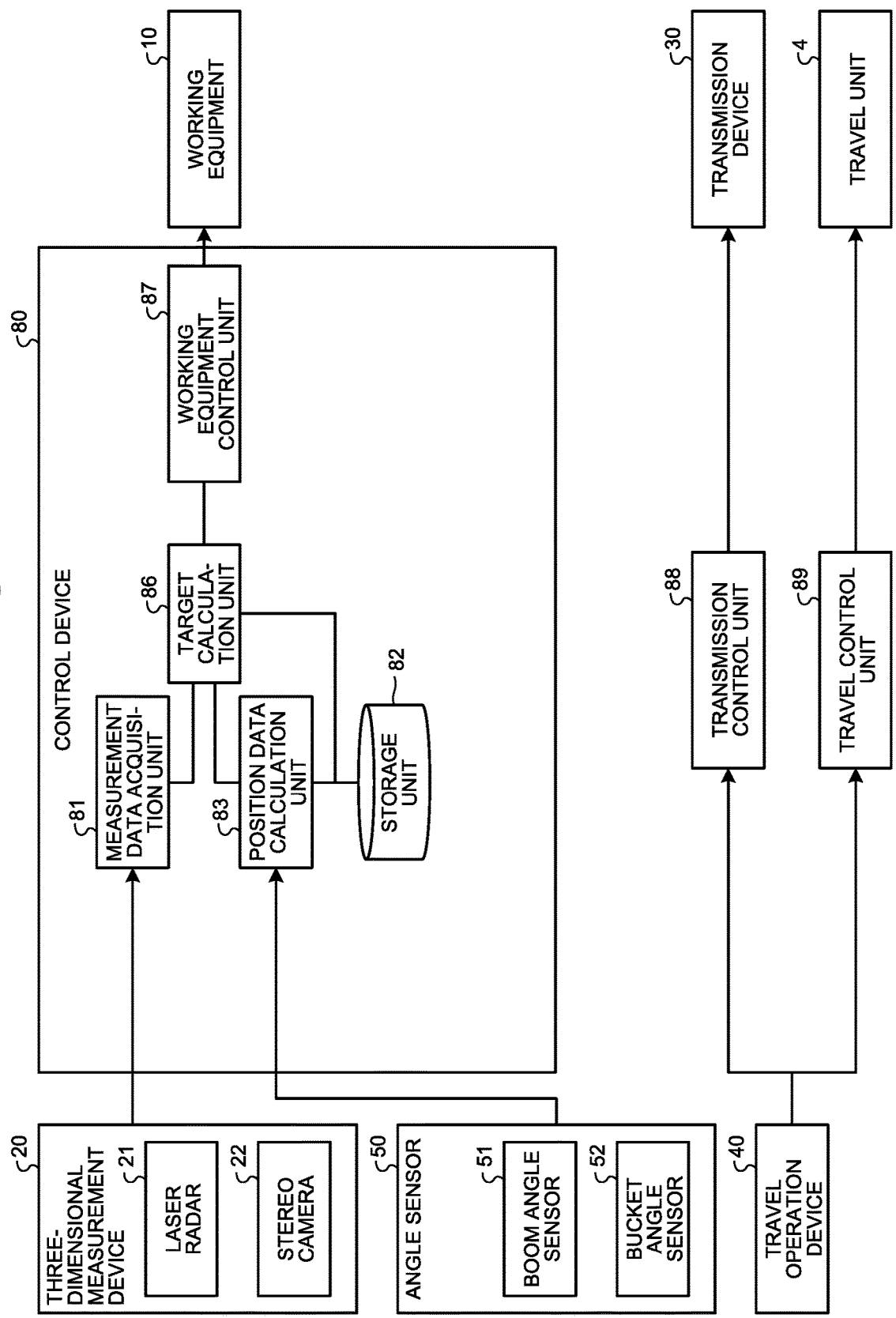
FIG. 4 is a functional block diagram illustrating a control device of the loading machine according to the present embodiment.

FIG. 4 is a functional block diagram illustrating the control device 80 of the wheel loader 1 according to the present embodiment. The control device 80 includes a computer system.

The working equipment 10, the transmission device 30, the travel unit 4, the three-dimensional measurement device 20, the angle sensor 50, and the travel operation device 40 are connected to the control device 80.

The control device 80 includes a measurement data acquisition unit 81, a storage unit 82, a position data calculation unit 83, a target calculation unit 86, and a working equipment control unit 87.

The measurement data acquisition unit 81 acquires measurement data from the three-dimensional measurement device 20.

The storage unit 82 stores working equipment data. The working equipment data includes design data or specification data of the working equipment 10. The design data of the working equipment 10 includes, for example, computer-aided design (CAD) data of the working equipment 10. The working equipment data includes profile data of the working equipment 10. The profile data of the working equipment 10 includes dimension data of the working equipment 10. In the present embodiment, the working equipment data includes a boom length, a bucket length, and a bucket profile. The boom length represents a distance between a boom rotation shaft and a bucket rotation shaft. The bucket length represents a distance between the bucket rotation shaft and the front end portion 12B of the bucket 12. The boom rotation shaft represents a rotation shaft of the boom 11 with respect to the vehicle body front portion 2F and includes a connecting pin that connects the vehicle body front portion 2F and the boom 11. The bucket rotation shaft represents a rotation shaft of the bucket 12 with respect to the boom 11 and includes a connecting pin that connects the boom 11 and the bucket 12. The bucket profile includes the shape and dimensions of the bucket 12. The dimensions of the bucket 12 include a bucket width that represents a distance between a left end and a right end of the bucket 12, a height of an opening of the bucket 12, a bucket bottom length, and the like.

The position data calculation unit 83 calculates position data of the working equipment 10, on the basis of angle data of the working equipment 10 detected by the angle sensor 50 and the working equipment data of the working equipment 10 stored in the storage unit 82. The position data calculation unit 83 calculates, for example, position data of the bucket 12 in the vehicle body coordinate system.

The target calculation unit 86 calculates three-dimensional data of the transport vehicle LS including the vessel BE measured by the three-dimensional measurement device 20, on the basis of measurement data acquired by the measurement data acquisition unit 81. The three-dimensional data of the transport vehicle LS represents a three-dimensional shape of the transport vehicle LS.

The target calculation unit 86 calculates parameters relating to the transport vehicle LS on the basis of the three-dimensional data of the transport vehicle LS. The parameters relating to the transport vehicle LS include a position (height) of the upper end portion BEt of the transport vehicle LS (vessel BE) relative to the ground surface RS and a distance Db from the wheel loader 1 to the transport vehicle LS. The distance Db from the wheel loader 1 to the transport vehicle LS represents, for example, a distance between the front end portion 12B of the bucket 12 and a closest point indicating a portion of the transport vehicle LS closest to the front end portion 12B of the bucket 12 in a horizontal direction.

The working equipment control unit 87 controls the movement of the working equipment 10 to load excavated material on the vessel BE, on the basis of the three-dimensional data of the transport vehicle LS calculated by the target calculation unit 86. The working equipment control unit 87 controls the movement of the working equipment 10 to load the excavated material on the vessel BE, on the basis of height data of the upper end portion BEt of the vessel BE and distance data indicating a distance from the wheel loader 1 to the transport vehicle LS.

The control of the movement of the working equipment 10 includes control of the movement of at least one of the boom cylinder 13 and the bucket cylinder 14. The wheel loader 1 includes a hydraulic pump, a boom control valve that controls the flow rate and direction of hydraulic oil supplied from the hydraulic pump to the boom cylinder 13, and a bucket control valve that controls the flow rate and direction of hydraulic oil supplied from the hydraulic pump to the bucket cylinder 14. The working equipment control unit 87 outputs a control signal to the boom control valve and the bucket control valve, controlling the flow rate and direction of the hydraulic oil supplied to the boom cylinder 13 and the bucket cylinder 14, controlling rising and lowering movement of the boom 11 and rising and lowering movement of the bucket 12.

In the present embodiment, the target calculation unit 86 removes partial data indicating at least part of the working equipment 10 from measurement data, on the basis of position data of the working equipment 10 calculated by the position data calculation unit 83 and calculates height data of the vessel BE and distance data indicating a distance from the wheel loader 1 to the transport vehicle LS, on the basis of the measurement data with the partial data removed.

In the present embodiment, the wheel loader 1 includes a transmission control unit 88 and a travel control unit 89.

The travel control unit 89 controls the movement of the travel unit 4 on the basis of the operation of the travel operation device 40 by the driver of the wheel loader 1. The travel control unit 89 outputs a drive instruction including an accelerator command for operating the drive device 4A, a brake command for operating the brake device 4B, and a steering command for operating the steering device 4C.

[Loading Work Based on Measurement Data from Stereo Camera]

Figure 5:
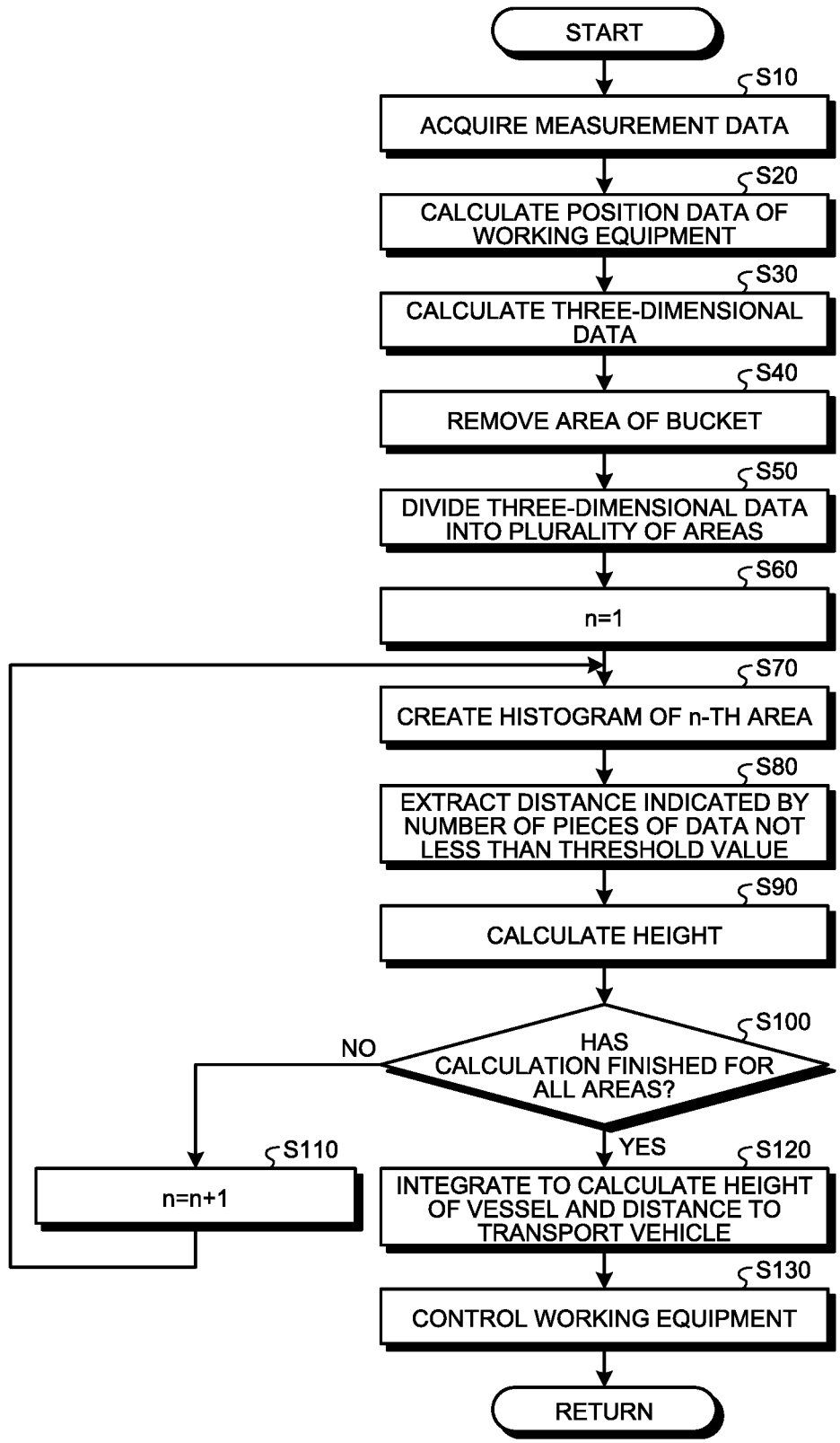
FIG. 5 is a flowchart illustrating a control method for the loading machine according to the present embodiment in which loading work is performed on the basis of measurement data from a stereo camera.

FIG. 5 is a flowchart illustrating a control method for the wheel loader 1 according to the present embodiment in which loading work is performed on the basis of measurement data from the stereo camera 22.

In the loading work mode in which the wheel loader 1 moves forward to the transport vehicle LS to load thereon excavated material excavated by the working equipment 10, the stereo camera 22 measures a measurement target including at least the transport vehicle LS. In an imaging range of the stereo camera 22 (vision area of an optical system of the stereo camera 22), not only the transport vehicle LS but also, for example, the ground surface RS or objects around the transport vehicle LS are placed as the measurement target. Measurement data from the stereo camera 22 is output to the control device 80. The measurement data acquisition unit 81 acquires the measurement data from the stereo camera 22 (step S10).

The measurement data from the stereo camera 22 includes image data of the measurement target. The image data includes a plurality of pixels. The image data of the measurement target acquired by the measurement data acquisition unit 81 is output to the target calculation unit 86.

In the present embodiment, the measurement data acquisition unit 81 acquires first image data from a first camera 22A of the stereo camera 22 and acquires second image data from a second camera 22B. The first image data and the second image data have two-dimensional image data.

Furthermore, in the loading work mode, the angle sensor 50 detects an angle of the working equipment 10. The angle of the working equipment 10 includes an angle of the boom 11 that is detected by the boom angle sensor 51 and an angle of the bucket 12 that is detected by the bucket angle sensor 52. Angle data indicating the angle of the working equipment 10 is output to the position data calculation unit 83.

The position data calculation unit 83 calculates position data of the working equipment 10 on the basis of the angle data of the working equipment 10 and the working equipment data of the working equipment 10 that is stored in the storage unit 82 (step S20).

The position data of the working equipment 10 calculated by the position data calculation unit 83 is output to the target calculation unit 86. The position data of the working equipment 10 includes, for example, position data of each portion of the bucket 12 in the vehicle body coordinate system.

The target calculation unit 86 performs stereo processing on the image data (first image data and second image data) to calculate distances from the stereo camera 22 to a plurality of measurement points PI on a surface of the transport vehicle LS appearing in each pixel. The target calculation unit 86 calculates, for example, three-dimensional data in the vehicle body coordinate system on the basis of the distances to the respective measurement points PI (step S30).

The target calculation unit 86 removes three-dimensional data in the area of partial data indicating at least part of the working equipment 10, from the three-dimensional data (step S40). The position of the bucket 12 (position indicated by the partial data) in the vehicle body coordinate system is known, and thus, three-dimensional data after removal can be obtained by simply removing the partial data from the three-dimensional data obtained by the stereo processing. When removing the partial data from the three-dimensional data, the target calculation unit 86 acquires the position data of the working equipment 10, identifies the position of the working equipment 10 in the vehicle body coordinate system, and then removes the partial data at that position.

The target calculation unit 86 divides the three-dimensional data acquired by the stereo camera 22 into a plurality of areas DA (step S50).

Figure 6:
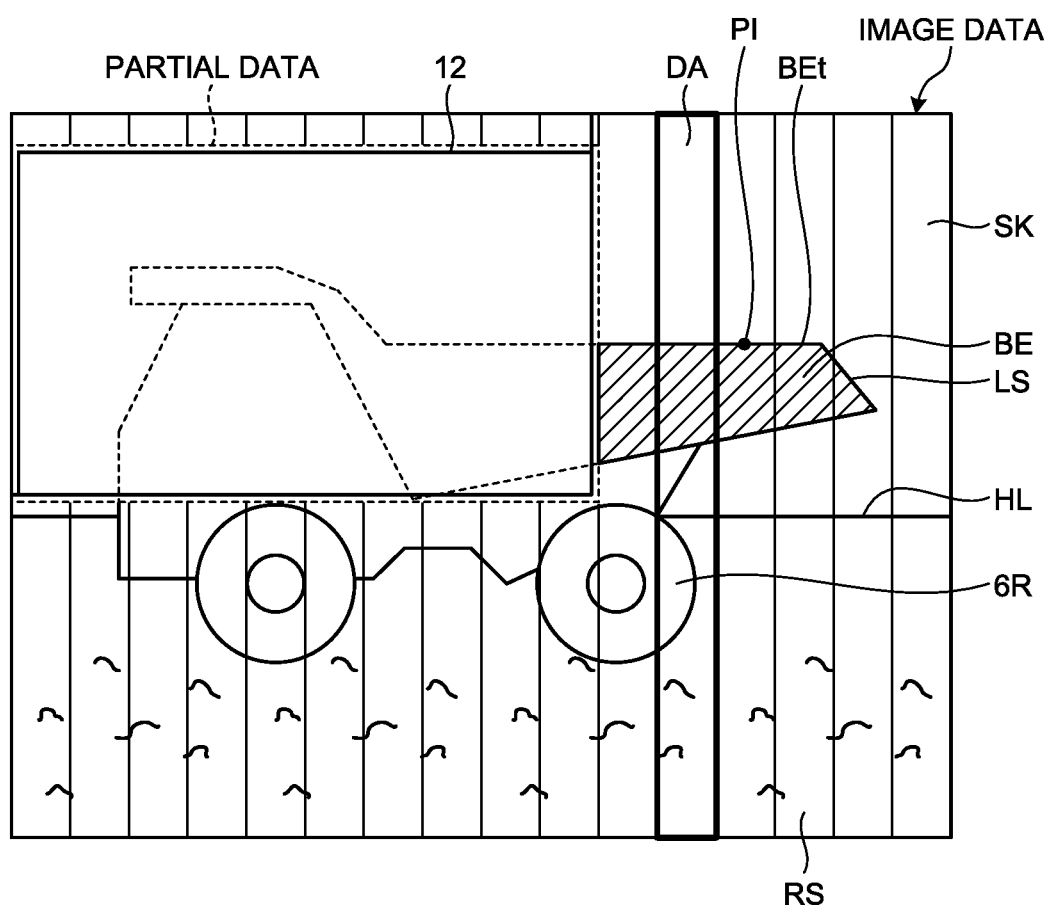
FIG. 6 is a diagram illustrating an example of image data calculated on the basis of image data acquired by the stereo camera according to the present embodiment.

FIG. 6 is a diagram illustrating an example of image data acquired by the stereo camera 22. Hereinafter, processing of the three-dimensional data will be described, but, for convenience, the description will be given using the image data acquired by the stereo camera 22. As illustrated in FIG. 6, the image data includes not only an image of the transport vehicle LS but also, for example, an image of ground surface RS and an object around the transport vehicle LS. In the image data, the partial data indicating the bucket 12 is removed after obtaining the three-dimensional data through the stereo processing. The target calculation unit 86 divides the three-dimensional data from which the partial data indicating the bucket 12 has been removed, into a plurality of areas DA. In the present embodiment, the target calculation unit 86 divides the three-dimensional data in a horizontal direction to generate a plurality of areas DA. In the following description, each of the areas DA generated by dividing the three-dimensional data will be appropriately referred to as a divided data DA.

The divided data DA extends long in a vertical direction. Each of a plurality of pieces of the divided data DA includes a plurality of pieces of point cloud data indicating a distance from the stereo camera 22 to the measurement target.

Next, the target calculation unit 86 creates a histogram indicating a relationship between a distance from the wheel loader 1 and the number of pieces of data of point cloud data located at each distance, for each of the plurality of pieces of divided data DA. The target calculation unit 86 identifies three-dimensional data obtained by measuring the transport vehicle LS, from a plurality of measurement targets in the image data, on the basis of the histogram.

An initial value 1 is set to a counter n (step S60). The target calculation unit 86 creates a histogram for each of the first divided data DA1 to the Nth divided data DAN (step S70).

Figure 7:
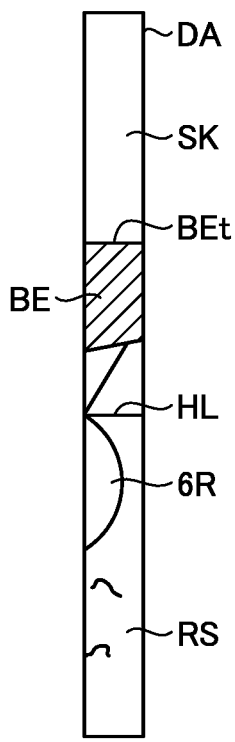
FIG. 7 is a diagram illustrating an example of one piece of divided data extracted from the image data according to the present embodiment.

FIG. 7 is a diagram illustrating an example of one piece of divided data DA extracted from the three-dimensional data. In the example illustrated in FIG. 7, the divided data DA includes three-dimensional data of pixels indicating the vessel BE, three-dimensional data of pixels indicating the rear tire 6R, three-dimensional data of pixels indicating the ground surface RS, and three-dimensional data of pixels indicating a dump truck structure. Other configurations include a horizon line HL and the sky SK. Since the area of the sky SK is infinite, the sky SK is not counted as data.

Figure 8:
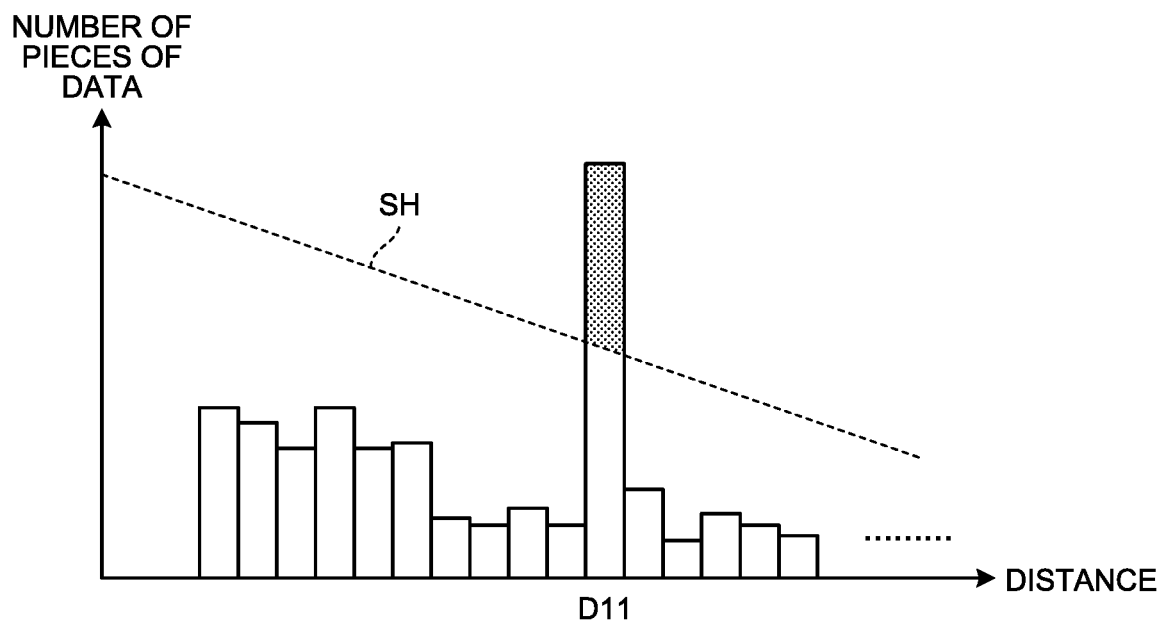
FIG. 8 is a histogram illustrating a relationship between a distance from the loading machine and the number of pieces of pixel data indicating the same distance as the distance from the loading machine, in the divided data according to the present embodiment.

FIG. 8 is a histogram illustrating a relationship, in the divided data DA, between a distance from the wheel loader 1 and the number of pieces of data of the three-dimensional data included in each distance range.

When the loading work mode is performed, the wheel loader 1 travels toward the transport vehicle LS from a lateral side of the transport vehicle LS. The proportion of the transport vehicle LS is large in the divided data DA. The lateral side surface of the transport vehicle LS is substantially flat and stands substantially vertically, and a distance from the stereo camera 22 to each measurement point PI on the lateral side surface of the transport vehicle LS is substantially constant. Therefore, in the histogram, a large amount of data is counted in the distance from the stereo camera 22 to the measurement point PI on the transport vehicle LS. On the other hand, although the proportion of the ground surface RS in the divided data DA may be large, a distance from the wheel loader 1 to the ground surface RS differs depending on each portion of the ground surface RS. Therefore, when the histogram is created on the basis of the divided data DA, it is possible to presume that three-dimensional data within a range of a predetermined distance that has a large number of pieces of data is the three-dimensional data obtained by measuring the transport vehicle LS.

As illustrated in FIG. 8, the target calculation unit 86 sets a line indicating a threshold value SH in the created histogram and extracts a distance indicated by pixels having the number of pieces of data not less than the threshold value SH. The target calculation unit 86 determines that a measurement target positioned at a distance indicated by the pixels having the number of pieces of data not less than the threshold value SH is the transport vehicle LS (step S80).

Note that each distance on the horizontal axis in the histogram has a width of a predetermined distance. For example, the image data illustrated in FIG. 6 includes a measurement target other than the transport vehicle LS, such as the ground surface RS, and thus, histogram has data over a wide distance as illustrated in FIG. 8. On the other hand, in the image data illustrated in FIG. 6, the proportion of the lateral side surface area of the transport vehicle LS is large. Furthermore, the side surface of the transport vehicle LS stands substantially vertically from the ground surface RS, and the distance from the stereo camera 22 to each measurement point PI on the lateral side surface of the transport vehicle LS is substantially constant. Therefore, in the histogram, a large amount of data is counted in the distance from the stereo camera 22 to the measurement point PI on the transport vehicle LS. The target calculation unit 86 determines, as the measurement data of the transport vehicle LS, three-dimensional data within a distance width in which a large amount of data counted is included. From the histogram of FIG. 8, three-dimensional data included within the range of a distance D11 is estimated as the measurement data of the transport vehicle LS. The target calculation unit 86 identifies the three-dimensional data included within the range of the distance D11 as the measurement data of the transport vehicle LS and, as described later, calculates the distance Db from the wheel loader 1 to the transport vehicle LS and the height of the upper end portion BEt of the vessel BE, on the basis of the three-dimensional data included in the distance D11 and position data of the bucket 12.

In an example illustrated in FIG. 8, pixels at the distance D11 that is a distance from the stereo camera 22 have the largest number of pieces of data and the number of pieces of data is not less than the threshold value SH. Therefore, the target calculation unit 86 determines that a measurement target positioned at a distance D11 indicated by the pixels having the number of pieces of data not less than the threshold value SH is the transport vehicle LS.

Note that, as illustrated in FIG. 8, the threshold value SH is set to a smaller value as the distance from the wheel loader 1 is increased. In the image data, a measurement target positioned closer to the wheel loader 1 indicates a larger proportion, and a measurement target positioned farther from the wheel loader 1 indicates a smaller proportion. The ground surface positioned closer to the wheel loader 1 occupies a wider area in the image (measurement range) than the ground surface positioned farther therefrom. Therefore, the threshold value is reduced as the distance increases, thereby appropriately removing noise, accurately selecting the width of distance at which the transport vehicle is positioned. Therefore, the threshold value SH is set to a smaller value as the distance from the wheel loader 1 is increased so that the threshold value SH has a constant function to a measurement target is constant even if the distance from the wheel loader 1 changes.

Next, the target calculation unit 86 calculates the height of the vessel BE on the basis of the three-dimensional data indicating the vessel BE specified in the divided data DA (step S90).

Figure 9:
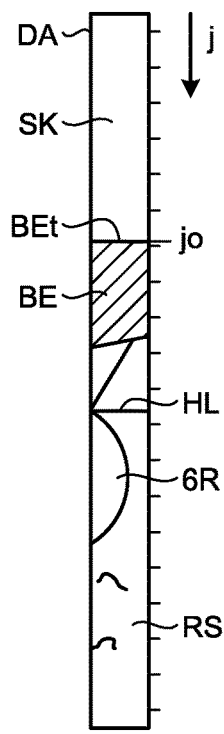
FIG. 9 is a diagram illustrating an example of a vessel extracted in one piece of divided data according to the present embodiment.

FIG. 9 is a diagram illustrating an example of a vessel BE extracted in one piece of divided data DA. As illustrated in FIG. 9, the target calculation unit 86 extracts three-dimensional data indicating the transport vehicle LS in the divided data DA and then calculates height data of the transport vehicle LS on the basis of the extracted three-dimensional data.

As illustrated in FIG. 9, in the divided data DA, a j-coordinate is defined in a vertical direction. The vertical direction of the divided data DA represents a longitudinal direction of the divided data DA. The target calculation unit 86 extracts a distance indicated by each of a plurality of pieces of three-dimensional data arranged vertically in the divided data DA. In other words, the target calculation unit 86 extracts a distance indicated by three-dimensional data of each of a plurality of j-coordinates for each j-coordinate.

Figure 10:
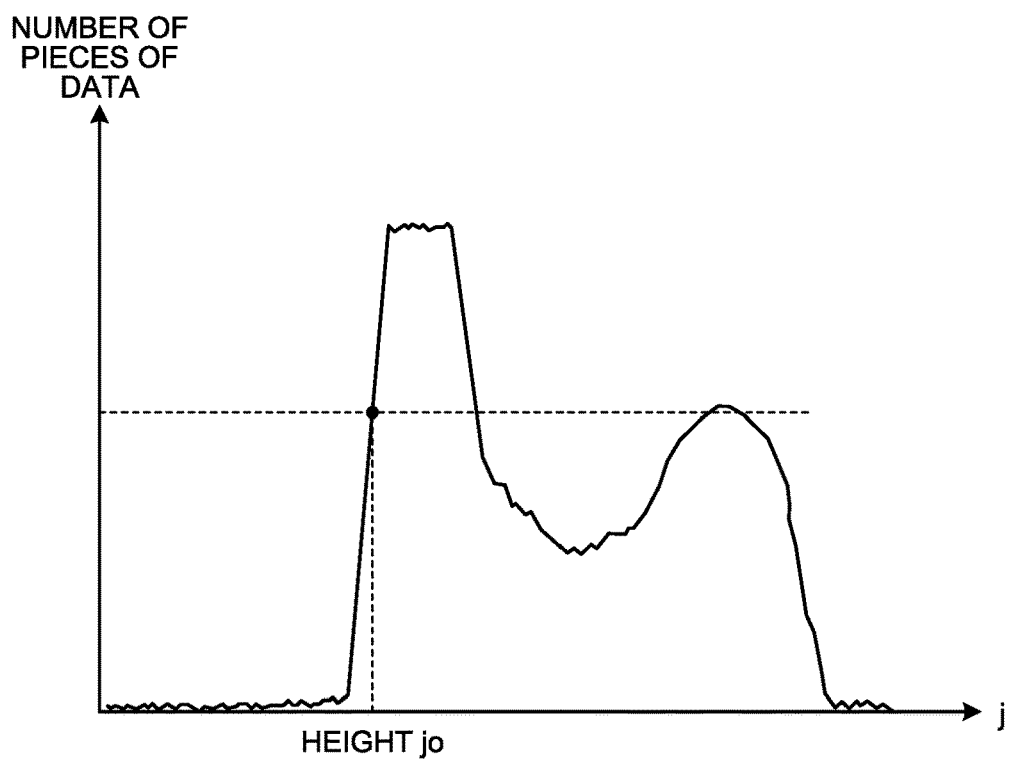
FIG. 10 is a graph illustrating a relationship between a j-coordinate and the number of pieces of pixel data indicating a transport vehicle positioned on the j-coordinate, in the divided data according to the present embodiment.

FIG. 10 is a graph illustrating a relationship of a j-coordinate with the number of pieces of data of the three-dimensional data indicating a transport vehicle LS on the j-coordinate, in the divided data DA.

As illustrated in FIG. 9, the divided data DA includes three-dimensional data indicating the distance D11 to the transport vehicle LS and three-dimensional data indicating a distance different from the distance D11. The distance D11 has a certain width. In the divided data DA, above pixels indicating the upper end portion of the vessel BE, there are only pixels indicating the sky, and there is no pixels of a target positioned at a distance (the distance D11 in the present embodiment) equivalent to that of the transport vehicle. In other words, as illustrated in FIG. 10, on a j-coordinate above the upper end portion of the vessel BE, the number of pieces of data of the three-dimensional data indicating the vessel BE is almost zero.

On a j-coordinate Jo that coincides with the upper end portion of the vessel BE, the number of pieces of data of the three-dimensional data indicating the vessel BE rises rapidly. The target calculation unit 86 determines, as the height of the upper end portion of the vessel BE, the j-coordinate indicating a change point at which the number of pieces of data of the three-dimensional data indicating the vessel BE changes rapidly. In other words, the target calculation unit 86 determines, as the height of the upper end portion of the vessel BE, that a changing point at which the distance indicated by each of a plurality of pixels arranged vertically in the divided data DA changes rapidly.

As described above, the height of the upper end portion of the vessel BE is calculated for one piece of divided data DA. The target calculation unit 86 carries out the above-described processing of step S70 to step S90 for each of the plurality of pieces of divided data DA. In other words, the target calculation unit 86 determines whether the processing of calculating the height of the upper end portion of the vessel BE is finished for all of the divided data DA (step S100). If it is determined that the processing of calculating the heights is not finished for all of the divided data DA (step S100: No), the counter n is incremented (step S110), and the process returns to step S70.

If it is determined that the processing of calculating the height is finished for all of the divided data DA (step S100: Yes), the target calculation unit 86 integrates results of calculation of the height of the upper end portion of the vessel BE in the plurality of pieces of divided data DA and calculates the final height of the upper end portion of the vessel BE from the ground surface RS (step S120). When calculating the final height of the upper end portion of the vessel BE from the ground surface RS, for example, data indicating the largest height of the upper end portion of the vessel BE in the plurality of pieces of divided data DA may be used as the final height of the upper end portion of the vessel BE or an average value of the heights of the upper end portion of the vessel BE in the plurality of pieces of divided data DA may be used as the final height of the upper end portion of the vessel BE.

Furthermore, the target calculation unit 86 calculates the distance Db from the wheel loader 1 to the transport vehicle LS on the basis of the three-dimensional data representing the measurement data of the transport vehicle LS, which is identified from the histogram, and the position data of the bucket 12 (step S120). The measurement data of the transport vehicle LS, three-dimensional data corresponding to the transport vehicle LS, and image data corresponding to the transport vehicle LS are examples of loading target data.

The working equipment control unit 87 controls the working equipment 10 on the basis of the height of the vessel BE and the distance to the transport vehicle LS that are calculated by the target calculation unit 86 (step S130).

In other words, as described with reference to FIG. 3, the working equipment control unit 87 causes the rising movement of the boom 11 while controlling the angle of the bucket 12 so as to position the bucket 12 above the upper end portion of the vessel BE and so as to hold the excavated material in the bucket 12 without spilling, on the basis of the distance to the transport vehicle LS and the height of the upper end portion of the vessel BE that are calculated by the target calculation unit 86, while the wheel loader 1 is moving forward to the transport vehicle LS. After the rising movement of the boom 11 and positioning of the bucket 12 above the vessel BE, the working equipment control unit 87 controls the working equipment 10 to cause tilting movement of the bucket 12. Thus, the excavated material is discharged from the bucket 12 and loaded on the vessel BE. Furthermore, the traveling speed of the wheel loader 1 and a current height of the bucket 12 may be taken into consideration. Thus, the working equipment 10 is controllable at an optimum rising speed so that the position of the front end portion 12B is higher than the upper end portion BEt of the vessel BE immediately before the front end portion 12B of the bucket 12 reaches the closest point of the transport vehicle LS.

[Effects]

As described above, according to the present embodiment, controlling the working equipment 10 on the basis of the height data of the upper end portion BEt of the vessel BE enables the working equipment control unit 87 to control the working equipment 10 to be positioned at an appropriate height, for example, even when the type of the transport vehicle LS is changed and thus the height of the vessel BE is changed. In other words, for example, when the upper end portion BEt of the vessel BE has a large height, the working equipment control unit 87 is operable to raise the working equipment 10 to the highest position within a movable range of the working equipment 10 to discharge the excavated material in the bucket 12 into the vessel BE. Furthermore, when the upper end portion BEt of the vessel BE has a small height, the working equipment control unit 87 is operable to discharge the excavated material held in the bucket 12 into the vessel BE while positioning the working equipment 10 at a position slightly higher than the upper end portion BEt of the vessel BE. Thus, it is possible to prevent the working equipment 10 from being unnecessarily raised to a high position, and thus, the loading work can be performed efficiently. Furthermore, since the excavated material is not discharged from an unnecessarily high place, it is possible to suppress a large impact on the vessel BE.

Furthermore, the working equipment 10 is controlled on the basis of not only the height data of the vessel BE but also the distance data indicating a distance from the wheel loader 1 to the transport vehicle LS, and thus the excavated material held in the bucket 12 can be loaded into the vessel BE, for example, while preventing the working equipment 10 from making contact with the vessel BE or while holding the excavated material in the bucket 12 without spilling. Furthermore, the rising speed of the bucket 12 can be controlled to an optimum speed on the basis of the current height of the bucket 12, the distance data indicating a distance to the transport vehicle LS, and the traveling speed of the wheel loader 1, thereby reducing an unnecessary load.

Furthermore, removal of the partial data indicating the bucket 12 from the image data can perform stereo processing on the image data with a noise component removed. Thereby, the three-dimensional data of the transport vehicle LS can be acquired in a preferable manner.

Second Embodiment

The second embodiment will be described. In the following description, component elements that are the same as or equivalent to those in the above embodiments are denoted by the same reference numerals, and description thereof will be simplified or omitted.

[Loading Work from Measurement Data from Laser Radar]

In the above embodiments, the loading work based on the measurement data from the stereo camera 22 has been described. In the present embodiment, loading work based on measurement data from a laser radar 21 will be described.

Figure 11:
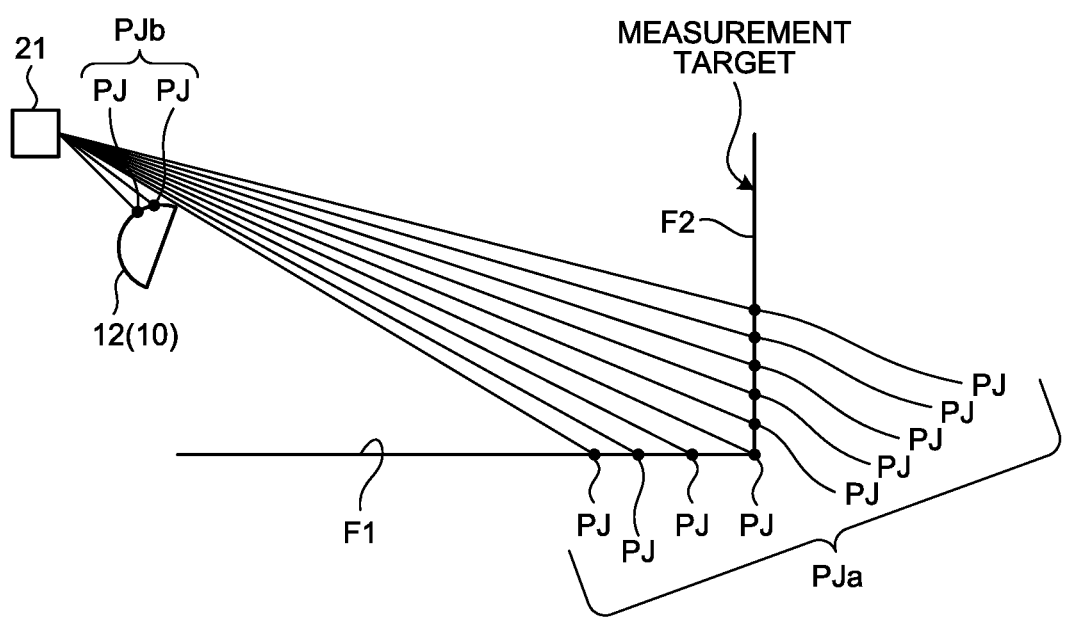
FIG. 11 is a diagram illustrating movement of a laser radar according to the present embodiment.

FIG. 11 is a diagram illustrating movement of the laser radar 21. As illustrated in FIG. 11, the laser radar 21 radiates a laser beam to each of a plurality of irradiation points PJ on a surface of a measurement target to measure a distance to each of the plurality of irradiation points PJ.

In the present embodiment, the target calculation unit 86 categorizes the irradiation points PJ into a plurality of groups on the basis of distances from the wheel loader 1 (laser radar 21) to the respective irradiation points PJ and identifies the measurement target on the basis of at least one of a group length L in a radiation direction of the laser beam, group gravity center height, and a group inclination angle K relative to the ground surface RS.

For example, in the loading work mode, the measurement target includes at least one of the ground surface RS, the transport vehicle LS, and an object around the transport vehicle LS. The target calculation unit 86 identifies whether which one of the ground surface RS, natural ground DS, and the transport vehicle LS is the measurement target, on the basis of at least one of the group length L, group gravity center height, and group inclination angle K.

The target calculation unit 86 performs grouping of the plurality of irradiation points PJ. The grouping means, for example, grouping a plurality of irradiation points PJ in which a difference in distance between adjacent irradiation points PJ is not more than a predetermined threshold value into one group. In an example illustrated in FIG. 11, for example, there is a large difference in distance between irradiation points PJa defined by radiation on the surface of the measurement target and irradiation points PJb defined by radiation on part of the working equipment 10. Therefore, the irradiation points PJa defined on the surface of the measurement target are grouped into one group, and the irradiation points PJb defined on the surface of the working equipment 10 are grouped into another group.

The target calculation unit 86 removes the group of the irradiation points PJb representing the partial data in the working equipment 10, divides the group of the irradiation points PJa group representing the measurement target into groups, and categorizes the plurality of irradiation points PJ into a first group and a second group.

FIG. 12 is a schematic diagram illustrating division into groups. As illustrated in FIG. 12(A), the division into groups represents processing in which endmost irradiation points PJ of the plurality of irradiation points PJ are connected by an imaginary straight line IM, an irradiation point PJ with the longest vertical distance from the straight line IM is defined as a division point PJK, and then the irradiation points PJ are divided into two groups on the basis of the division point PJK. The division into groups is a method of further dividing the irradiation points PJa in FIG. 11 into smaller groups.

The division point PJK is an irradiation point PJ that is an inflection point of an imaginary line connecting a plurality of irradiation points PJ forming a group. Therefore, as illustrated in FIG. 12(B), on the basis of the division point PJK, the plurality of irradiation points PJ can be divided into two groups, and in each of the groups, the irradiation points PJ are arranged linearly. As illustrated in FIG. 12(B), a group of irradiation points PJ closer to the laser radar 21 can be regarded as a group of irradiation points PJ representing a first surface F1 of the measurement target, and a group of irradiation points PJ farther from the laser radar 21 can be regarded as a group of irradiation points PJ representing a second surface F2 of the measurement target. In this way, the target calculation unit 86 is configured to perform division into groups to categorize a plurality of irradiation points PJ into the first group and the second group.

The target calculation unit 86 performs a straight-line fitting process on the plurality of irradiation points PJ in each of the first group and the second group. After performing the fitting process, the target calculation unit 86 calculates at least one of the group length L in a radiation direction of the laser beam, the group inclination angle K relative to the ground surface RS, and the group gravity center height H. In an example illustrated in FIG. 12, the target calculation unit 86 calculates an inclination K1 and gravity center height H1 relating to the first group, an inclination K2 and gravity center height H2 relating to the second group, and group lengths L1 and L2.

The target calculation unit 86 identifies whether the measurement target is any of the ground surface RS and the transport vehicle LS, on the basis of at least one of the group length L, the group inclination angle K, and the group gravity center height H.

When the group inclination angle K is less than an angle threshold value, the target calculation unit 86 determines that the measurement target is the ground surface RS. When the group inclination angle K is not less than the angle threshold value, the target calculation unit 86 determines that the measurement target is the transport vehicle LS.

In general, the ground surface RS is substantially parallel to a horizontal plane, and therefore, when a group has a group inclination angle K that is small and less than the angle threshold value, the group can be determined to be the ground surface RS. A lateral side surface of the transport vehicle LS (vessel BE) is substantially perpendicular to the ground surface RS, and therefore, when a group has a group inclination angle K that is not less than the angle threshold value, the group can be determined to be the transport vehicle LS.

Note that when the group length L is not less than a dimensional threshold value, the target calculation unit 86 may determine that the measurement target is the ground surface RS. Note that when the group length L is less than the dimensional threshold value, the target calculation unit 86 may determine that the measurement target is the transport vehicle LS.

The surface of the natural ground DS is inclined relative to the ground surface RS, and therefore, when a group has a group length L that is not less than the dimensional threshold value, the group can be determined to be the ground surface RS. A lateral side surface of the transport vehicle LS (vessel BE) is substantially perpendicular to the ground surface RS, and therefore, when a group has a group length L that is less than the dimensional threshold value, the group can be determined to be the transport vehicle LS.

Note that when a group has a group gravity center height H that is less than a height threshold value, the target calculation unit 86 may determine that the group is the ground surface RS. When a group has a group gravity center height H that is not less than the height threshold value, the target calculation unit 86 may determine that the group is the transport vehicle LS.

Figure 13:
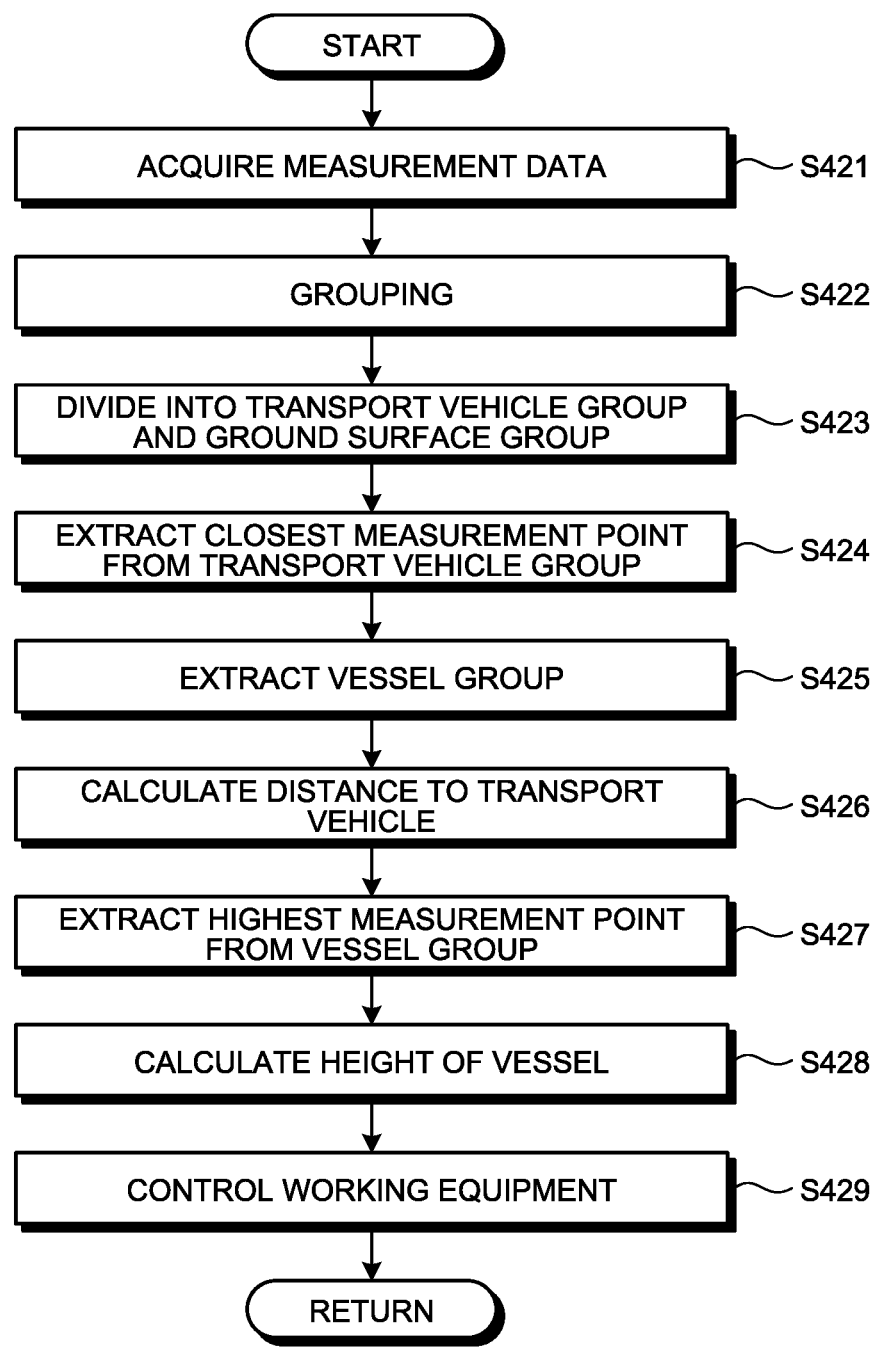
FIG. 13 is a flowchart illustrating a control method for the loading machine according to the present embodiment in which measurement data of a transport vehicle measured by the laser radar is processed.

FIG. 13 is a flowchart illustrating a control method for the wheel loader 1 according to the present embodiment in which measurement data of the transport vehicle LS measured by the laser radar 21 is processed.

In the loading work mode in which the wheel loader 1 moves forward to the transport vehicle LS to load excavated material excavated by the working equipment 10, the laser radar 21 measures the transport vehicle LS. When measuring the transport vehicle LS, the laser radar 21 radiates the laser beam to the transport vehicle LS.

The measurement data of the transport vehicle LS measured by the laser radar 21 includes a distance from the laser radar 21 to each of a plurality of irradiation points PJ on a surface of the transport vehicle LS to which the laser beam is radiated. The measurement data of the transport vehicle LS measured by the laser radar 21 is output to the control device 80. The measurement data acquisition unit 81 acquires the measurement data of the transport vehicle LS from the laser radar 21 (step S421).

Figure 14:
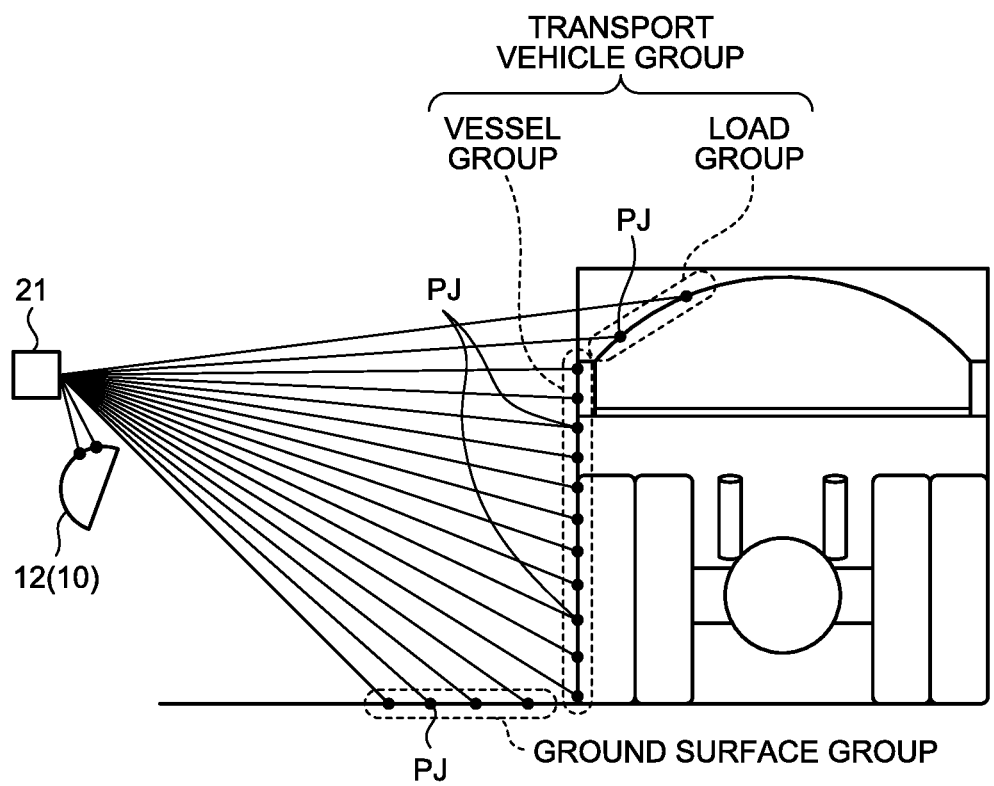
FIG. 14 is a diagram schematically illustrating a measurement method by the laser radar according to the present embodiment.

FIG. 14 schematically illustrates a measurement method by the laser radar 21. As illustrated in FIG. 14, the laser radar 21 measures a distance from each of the irradiation points PJ on a surface of the transport vehicle LS.

The target calculation unit 86 groups a plurality of irradiation points PJ (step S422).

As described with reference to FIG. 11, the target calculation unit 86 removes a group of irradiation points PJ indicating the working equipment 10. In addition, a group indicating a portion of the working equipment is removed. Furthermore, as described with reference to FIG. 12(A), the target calculation unit 86 divides the group of the irradiation points PJ indicating the measurement target into groups. Data indicating the portion of the working equipment is defined as the partial data.

Furthermore, as described with reference to FIG. 12(B), the target calculation unit 86 identifies the transport vehicle LS and the ground surface RS on the basis of at least one of the group length L in a radiation direction of the laser beam and the group inclination angle K relative to the ground surface RS.

In other words, the target calculation unit 86 performs division into groups to categorize a plurality of irradiation points PJ into a transport vehicle group and a ground surface group (step S423).

The target calculation unit 86 extracts an irradiation point PJ closest to the laser radar 21 from a plurality of irradiation points PJ of the transport vehicle group (step S424).

As illustrated in FIG. 14, the transport vehicle group includes a vessel group indicating a lateral side surface of the vessel BE and a load group indicating load loaded on the vessel BE. The target calculation unit 86 extracts a plurality of irradiation points PJ within a range of certain distance from the closest irradiation point PJ as the vessel group (step S425). Irradiation points PJ outside the range of certain distance are set as the load group.

The target calculation unit 86 calculates a distance from the wheel loader 1 to the transport vehicle LS on the basis of the closest irradiation point PK (closest point) (step S426).

The target calculation unit 86 extracts an irradiation point PJ at the highest position from the plurality of irradiation points PJ of the vessel group (step S427).

The target calculation unit 86 calculates the height of the upper end portion of the vessel BE on the basis of the irradiation point PJ at the highest position in the vessel group (step S428).

The working equipment control unit 87 controls the working equipment 10 on the basis of the distance to the transport vehicle LS and the height of the vessel BE that are calculated by the target calculation unit 86 (step S429).

[Effects]

As described above, also in the present embodiment, controlling the working equipment 10 on the basis of the height of the upper end portion of the vessel BE enables the working equipment control unit 87 to control the working equipment 10 to position the bucket 12 at an appropriate height due to appropriate rising speed of the working equipment 10, for example, even when the type of the transport vehicle LS is changed and thus the height of the vessel BE is changed.

[Computer System]

Figure 15:
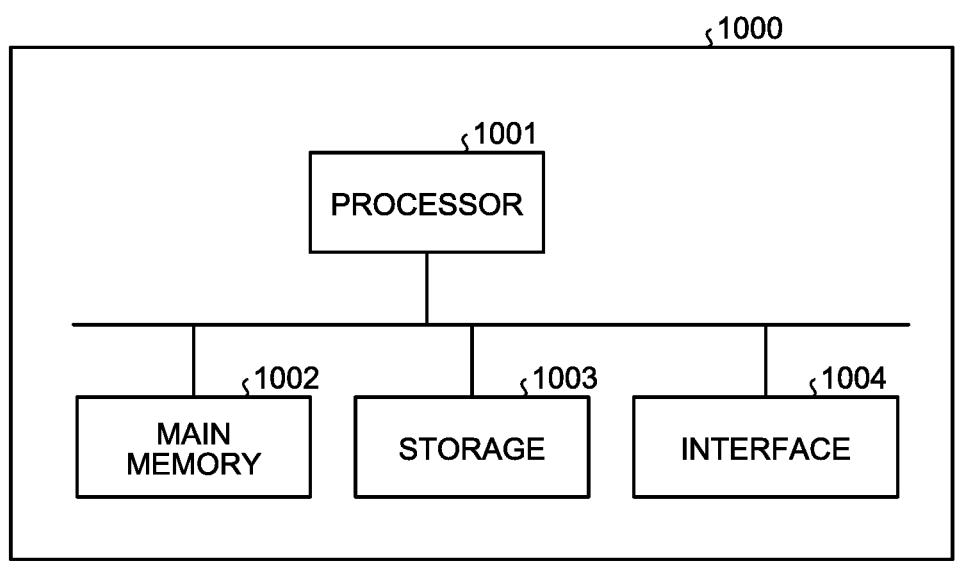
FIG. 15 is a block diagram illustrating an example of a computer system.

FIG. 15 is a block diagram illustrating an example of a computer system 1000. The control device 80 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The functions of the control device 80 described above are stored, as programs, in the storage 1003. The processor 1001 reads a program from the storage 1003, loads the program in the main memory 1002, and executes the processing described above according to the program. Note that the programs may be distributed to the computer system 1000 via a network.

Other Embodiments

Note that, in the above-described embodiment, both of the laser radar 21 and the stereo camera 22 are provided, as the three-dimensional measurement device 20, in the wheel loader 1. One of the laser radar 21 and the stereo camera 22 may be provided in the wheel loader 1. The three-dimensional measurement device 20 is only required to measure the three-dimensional shape of the work target and the relative position relative to the work target and is not limited to the laser radar 21 and the stereo camera 22.

In the above embodiment, it has been described that the three-dimensional data indicating the portion of the bucket 12 is removed from the three-dimensional data from the stereo camera 22 or laser radar 21, for removal of the partial data indicating the working equipment 10, but the present invention is not limited to that description, and the partial data corresponding to the portion of the working equipment 10 may be removed from image data, for example, when image data is used as the measurement data. In this case, instead of the three-dimensional measurement device 20, an imaging device can be used as the measurement device.

In the above-described embodiment, an image may be acquired to identify a pixel portion indicating the upper end portion BEt of the vessel BE by image recognition using artificial intelligence (AI) or the like, measuring the height Hb of the upper end portion BEt of the vessel BE by means of a stereo camera or the like on the basis of the positions of the corresponding pixels.

In addition, after identifying an image portion corresponding to the transport vehicle by image recognition such as AI, the pixel portion indicating the upper end portion BEt of the vessel BE may be identified, estimating a distance to the upper end portion BEt of the vessel BE or the ground surface RS on the basis of image information thereof, then, calculating the height Hb to the upper end portion BEt of the vessel BE.

Furthermore, instead of the three-dimensional measurement device 20, a position measurement device may be used. If two position measurement devices are employed, the position/orientation of the wheel loader 1 can be calculated, and thus, when a position measurement device is also provided at the transport vehicle LS to receive the position/orientation data of the transport vehicle LS, the distance Db from the wheel loader 1 to the transport vehicle LS can be calculated.

Furthermore, a wireless communication device such as a beacon or RFID may be installed between the wheel loader 1 and the transport vehicle LS to obtain the distance between the wheel loader 1 and the transport vehicle on the basis of the radio field intensity thereof.

In other words, the measurement device may include a three-dimensional measurement device, an imaging device, a position measurement device, a wireless communication device, or the like.

Note that in the above-described embodiments, the work site where the wheel loader 1 carries out work may be a mining site, a work site, or a building site.

The wheel loader 1 may be used for snow removal work, work in agriculture/livestock farming, or work in forestry.

In the above embodiment, the bucket 12 may include a plurality of tooth or may have a straight blade edge.

In the embodiments using the laser radar 21, the three-dimensional data has been categorized into groups, but the present invention is not limited to this, but likewise, in the embodiments of the stereo camera 22, after calculating the three-dimensional data, the three-dimensional data obtained by measuring the transport vehicle LS may be extracted after categorized into groups by a method similar to that in the embodiments of the laser radar 21.

Furthermore, even in the case of the image recognition based on the image data, the measurement targets appearing in the image data may be categorized into groups, and image data of the transport vehicle LS may be extracted therefrom.

In the above-described embodiment, an inertial measurement unit (IMU) may be attached to the wheel loader 1 to define a ground surface RS may be on the basis of a detection result from the inertial measurement device.

In the above-described embodiments, the height Hb of the upper end portion BEt of the vessel BE has been calculated by the stereo camera 22 or laser radar 21, but the invention is not limited to this, and information about the height Hb of the upper end portion BEt of the vessel BE may be received by inter-vehicle communication with the transport vehicle LS.

A table in which identification data of the transport vehicle LS and the height Hb of the upper end portion BEt of the vessel BE are associated may be provided in advance so as to obtain the height Hb of the upper end portion BEt of the vessel BE by identifying an identification code of the transport vehicle LS that is a loading target by some means such as inter-vehicle communication.

Note that, in the above-described embodiments, it is not essential that the three-dimensional data measured by the stereo camera 22 is divided.

Note that the working member connected to the distal end portion of the boom 11 may not be the bucket 12 but may employ a snowplow or snow bucket that is used for snow removal work, a bale glove or fork that is used for work in agriculture/livestock farming, or a fork or bucket that is used for work in forestry.

Note that the loading machine (working equipment) 1 is not limited to the wheel loader, but, for example, the control device 80 and the control method as described in the above embodiments may be applied to a loading machine with working equipment, such as an excavator or bulldozer.

REFERENCE SIGNS LIST

1 WHEEL LOADER (LOADING MACHINE)
2 VEHICLE BODY
2F VEHICLE BODY FRONT PORTION
2R VEHICLE BODY REAR PORTION
3 CAB
4 TRAVEL UNIT
4A DRIVE DEVICE
4B BRAKE DEVICE
4C STEERING DEVICE

5 WHEEL
5F FRONT WHEEL
5R REAR WHEEL
6 TIRE
6F FRONT TIRE
6R REAR TIRE
9 JOINT MECHANISM
10 WORKING EQUIPMENT
11 BOOM
12 BUCKET
12B FRONT END PORTION
13 BOOM CYLINDER
14 BUCKET CYLINDER
15 BELL CRANK
16 LINK
20 THREE-DIMENSIONAL MEASUREMENT DEVICE
21 LASER RADAR
22 STEREO CAMERA
22A FIRST CAMERA
22B SECOND CAMERA
30 TRANSMISSION DEVICE
40 TRAVEL OPERATION DEVICE
50 ANGLE SENSOR
51 BOOM ANGLE SENSOR
52 BUCKET ANGLE SENSOR
80 CONTROL DEVICE
81 MEASUREMENT DATA ACQUISITION UNIT
82 STORAGE UNIT
83 POSITION DATA CALCULATION UNIT
86 TARGET CALCULATION UNIT
87 WORKING EQUIPMENT CONTROL UNIT
88 TRANSMISSION CONTROL UNIT
89 TRAVEL CONTROL UNIT
BE VESSEL (LOADING TARGET)
DA DIVIDED DATA
DS NATURAL GROUND (EXCAVATION TARGET)
FX ROTATION AXIS
LS TRANSPORT VEHICLE
PJ IRRADIATION POINT
RX ROTATION AXIS
RS GROUND SURFACE
SH THRESHOLD VALUE

The invention claimed is:

1. A control device for a loading machine, comprising:
a measurement data acquisition unit that acquires measurement data of a measurement device mounted on the loading machine that includes working equipment;
a target calculation unit that extracts, from the measurement data, loading target data being measurement data on a loading target on which excavated material excavated by the working equipment is loaded and calculates, based on the loading target data, height data indicating a height of an upper end portion of the loading target and distance data indicating a distance from the loading machine to the loading target; and
a working equipment control unit that controls the working equipment based on the calculated height data and the calculated distance data.

2. The control device for a loading machine according to claim 1, further comprising:
a position data calculation unit that calculates position data of the working equipment, wherein
the target calculation unit removes partial data indicating at least part of the working equipment from the measurement data, based on position data of the working equipment and extracts the loading target data based on the measurement data with the partial data removed.

3. The control device for a loading machine according to claim 1, wherein
the target calculation unit extracts, as the loading target data, measurement data within a range of a predetermined distance from the loading machine, from the measurement data.

4. The control device for a loading machine according to claim 1, wherein
the target calculation unit categorizes the measurement data into a plurality of groups and extracts, from the plurality of groups, loading target data of a loading target group.

5. A control device for a loading machine, comprising:
a measurement data acquisition unit that acquires measurement data of a measurement device mounted on the loading machine that includes working equipment;
a position data calculation unit that calculates position data of the working equipment;
a target calculation unit that removes partial data indicating at least part of the working equipment from the measurement data, based on the position data of the working equipment and calculates height data indicating a height of an upper end portion of a loading target and distance data indicating a distance from the loading machine to the loading target, based on the measurement data with the partial data removed; and
a working equipment control unit that controls the working equipment based on the calculated height data and the calculated distance data.

6. A control method for a loading machine, comprising:
acquiring measurement data of a measurement device mounted on the loading machine that includes working equipment;
extracting, from the measurement data, loading target data being measurement data on a loading target on which excavated material excavated by the working equipment is loaded and calculating, based on the loading target data, height data indicating a height of an upper end portion of the loading target and distance data indicating a distance from the loading machine to the loading target; and
controlling the working equipment based on the calculated height data and the calculated distance data.

7. The control device for a loading machine according to claim 1, wherein the measurement device is a three-dimensional measurement device.

8. The control device for a loading machine according to claim 1, wherein the measurement device includes a laser radar that is a laser measurement device and a stereo camera that is a photogrammetric device.

9. The control device for a loading machine according to claim 1, wherein the target calculation unit performs stereo processing on image data to calculate distances from the measurement device to a plurality of measurement points on a surface of the loading target.

10. The control device for a loading machine according to claim 1, wherein the target calculation unit divides data in a horizontal direction to generate a plurality of areas.

11. The control device for a loading machine according to claim 10, wherein the target calculation unit creates a histogram indicating a relationship between a distance from the loading machine and the number of pieces of data of point cloud data located at each distance, for each of the plurality of pieces of divided data.

\* \* \* \* \*